United States Patent
Kami

(10) Patent No.: US 9,569,499 B2
(45) Date of Patent: Feb. 14, 2017

(54) METHOD AND APPARATUS FOR RECOMMENDING CONTENT ON THE INTERNET BY EVALUATING USERS HAVING SIMILAR PREFERENCE TENDENCIES

(75) Inventor: Nobuharu Kami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 413 days.

(21) Appl. No.: 13/824,771

(22) PCT Filed: Feb. 28, 2012

(86) PCT No.: PCT/JP2012/054961
§ 371 (c)(1),
(2), (4) Date: Mar. 18, 2013

(87) PCT Pub. No.: WO2012/118087
PCT Pub. Date: Sep. 7, 2012

(65) Prior Publication Data
US 2013/0185294 A1 Jul. 18, 2013

(30) Foreign Application Priority Data
Mar. 3, 2011 (JP) ................................. 2011-046855

(51) Int. Cl.
*G06F 17/30* (2006.01)
*G06Q 30/02* (2012.01)

(52) U.S. Cl.
CPC ..... *G06F 17/3053* (2013.01); *G06F 17/30699* (2013.01); *G06F 17/30867* (2013.01);
(Continued)

(58) Field of Classification Search
CPC ............ G06F 17/3053; G06F 17/30699; G06F 17/30867
(Continued)

(56) References Cited

U.S. PATENT DOCUMENTS 6,266,649 B1   7/2001   Linden et al.
8,200,689 B2 *   6/2012   Kamimaeda ............ G06F 17/30
                                                              707/767

(Continued)

FOREIGN PATENT DOCUMENTS

JP   2007025925 A   2/2007
JP   2008077386 A   4/2008
(Continued)

OTHER PUBLICATIONS

The international search report for PCT/JP2012/054961 mailed on May 29, 2012.
(Continued)

*Primary Examiner* — Jean M Corrielus

(57) ABSTRACT

A recommender system includes: an input section 103 configured to receive a search request from a user; a user managing section 104 configured to manage context information representing a characteristic of the user; an index-table managing section 105 configured to output an information object related to the search request of the user; a user-authority-value managing section 106 configured to calculate, on the basis of similarity between users calculated from comparison of the context information of the user and another user and reliability from a plurality of users for the other user, an authority value representing reliability from the user for the other user; a rating calculating section 107 configured to calculate an evaluation value of the user for the information object using a value obtained by weighting an evaluation value of the other user for the information object according to the authority value of the other user; and a ranked-list creating section 108 configured to output a list of information objects ranked on the basis of the evaluation value of the user.

9 Claims, 8 Drawing Sheets

(52) U.S. Cl.
CPC ......... *G06Q 30/02* (2013.01); *G06Q 30/0278* (2013.01); *G06Q 30/0282* (2013.01)

(58) Field of Classification Search
USPC ................................ 707/705, 802, 732, 736
See application file for complete search history.

(56) References Cited

U.S. PATENT DOCUMENTS

| | | | |
|---|---|---|---|
| 8,214,318 B2* | 7/2012 | Masuda | H04N 7/17318 706/54 |
| 2002/0188589 A1* | 12/2002 | Salmenkaita | G01C 21/20 |
| 2007/0143128 A1* | 6/2007 | Tokarev | G06Q 10/10 705/347 |
| 2007/0143281 A1* | 6/2007 | Smirin | G06F 17/30867 |
| 2008/0077575 A1* | 3/2008 | Tateno et al. | 707/5 |
| 2008/0104004 A1* | 5/2008 | Brave et al. | 706/45 |
| 2008/0120287 A1* | 5/2008 | Guan et al. | 707/5 |
| 2008/0295132 A1* | 11/2008 | Icho | H04N 5/44543 725/46 |
| 2009/0037355 A1* | 2/2009 | Brave et al. | 706/45 |
| 2009/0198666 A1* | 8/2009 | Winston et al. | 707/5 |
| 2010/0036839 A1* | 2/2010 | Kamimaeda | G06F 17/30 707/602 |
| 2010/0070454 A1* | 3/2010 | Masuda | H04N 7/17318 706/54 |
| 2010/0312644 A1* | 12/2010 | Borgs | G06Q 10/10 705/14.55 |
| 2012/0166377 A1* | 6/2012 | Sathish | G06Q 10/00 706/47 |
| 2013/0117367 A1* | 5/2013 | Murakami | G06F 17/30964 709/204 |

FOREIGN PATENT DOCUMENTS

| | | |
|---|---|---|
| JP | 2008165490 A | 7/2008 |
| JP | 2009503751 A | 1/2009 |
| JP | 2009140042 A | 6/2009 |
| JP | 2009181428 A | 8/2009 |
| WO | 2009097153 A1 | 8/2009 |

OTHER PUBLICATIONS

Abhinandan S. Das, Mayur Datar, Ashutosh Garg, Shyam Rajaram, "Google news personalization: scalable online collaborative filtering", in WWW '07: Proceedings of the 16th international conference on World Wide Web (2007), pp. 271-280.

J. Kleinberg, "Authoritative sources in a hyperlinked environment", In Proceedings of the Ninth Annual ACM-SIAM, Symposium on Discrete Algorithms, 1998, pp. 668-677.

* cited by examiner

METHOD AND APPARATUS FOR RECOMMENDING CONTENT ON THE INTERNET BY EVALUATING USERS HAVING SIMILAR PREFERENCE TENDENCIES

BACKGROUND

The present invention relates to a recommender system, a recommendation method, and a program.

According to an explosive quantitative increase and qualitative diversification of resources and information (items) available through a network, it is becoming difficult for individual users to access items that the users want when the users want the items. Therefore, there is a demand for a recommender system and a platform that provide optimum items taking into account context information that changes every moment such as characteristics, preference information, and situations of individuals. For this purpose, a context-aware recommender system customized for individual users becomes necessary that handles static information of which temporal change is slow such as preference information of the users and dynamic information that changes every moment such as the present locations.

The recommender system needs to provide items that the users are highly likely to evaluate as high quality. In the conventional recommender system, various methods have been proposed to improve satisfaction levels of provided information. As a simplest and general method, there is a method of calculating an average of evaluation results (ratings) of items referring to experiences in the past of other users. There is high probability that many users give high evaluation to high quality items. Therefore, in particular, when there are a large number of users, a certain effect can be expected.

For example, Patent Document 1 describes a system that extracts similarity among items from a history of items purchased by users in the past and displays items highly evaluated out of items having high similarity to items already known to attract interests of the users. However, if items highly evaluated in average are simply displayed, uniform information is provided to all the users. Therefore, the system sometimes does not work when there are only a small number of users or when only a small number of users have the same preference.

Therefore, there is known a method of analyzing preference characteristics of users from histories or the like of the users and calculating a weighted average with weight placed on opinions of users having high similarity to target users (active users) to be recommended. This is a method called Collaborative Filtering. The method is based on the premise that the active users feel, at higher probability, that opinions of users having senses of values similar to the senses of values of the active users are high quality. In considering the similarity, it is necessary to consider preference tendencies and present situations (contexts) that influence the interests of the users.

As the contexts, there are a static context and a dynamic context. As an example of the static context of which temporal change is relatively slow, there is preference information of users concerning items such as books, movies, and news. In an online shopping site, a word-of-mouth information site, or the like, commodities and items to be recommended are determined by estimating preference information of active users. Typically performed processing is processing for specifying users having highly similar behavior histories from behavior histories such as purchase histories of users and displaying items highly evaluated by the users. This is based on the premise that users having similar purchase histories are considered to have similar preferences and items highly evaluated by one user are highly likely to be highly evaluated by the other user. For example, Non-Patent Document 1 describes a system that recommends news on the basis of preference information of users having preference tendencies similar to the preference tendencies of active users.

Examples of a recommender system that uses the dynamic context include a real space application. The present location is a representative example of a user context that changes every moment. In the real space application, the present locations of users are acquired and managed using a GPS or the like and items related to the present locations are recommended. Similarity here is closeness of distances in terms of geodetic coordinates. The real space application is applied to, for example, a social networking application that displays other users present near active users and a recommender system that displays popular restaurants, sightseeing spots, and the like in neighborhoods.

On the other hand, users having high similarity do not always have a skill for performing correct value judgment. Therefore, there is a method of systematically selecting an authority user by evaluating evaluations themselves of users. This method is applied to, for example, extraction of an adviser highly evaluated in a Q&A site in which a plurality of users answer a question of a questioner. Specifically, other users evaluate a comment of a user and select advice of an authority user highly evaluated by the other users, whereby the method is realized.

Similarity among users and information concerning authority degrees are combined and items recommended by users having high similarity and high authority degrees are preferentially selected. This makes it possible to perform highly accurate recommendation.

Patent Document 2 discloses an information providing system including an information registering section configured to register respective kinds of browsing information while associating the browsing information with classification tags representing to which classifications contents of the browsing information correspond, an evaluation acquiring section configured to acquire evaluations by users who have already browed the respective kinds of browsing information, a user-information accumulating section configured to accumulate, together with identification information of the users, evaluations concerning the respective kinds of browsing information acquired by the evaluation acquiring section, a user-classification determining section configured to determine, from a relative relation of evaluations among a plurality of users accumulated in the user-information accumulating sections, a relation among the users for each of the classification tags associated with the respective kinds of browsing information, an information-classification determining section configured to determine, among a plurality of classification tags different from one another, a relation among the plurality of classification tags from a difference in a relation among the users determined by the user-classification determining section and a difference in evaluations for the users with respect to the browsing information affixed with the respective classification tags, and an information output section configured to select, when a specific user requests, concerning any one of the kinds of browsing information, browsing performed by using a keyword, the browsing information suitable for the specific user on the basis of a relation between the specific user and the other users determine by the user-classification determining section concerning a classification tag different from a specific classification tag to which the keyword belongs and a relation between the specific classification tag and the different classification tag determined by the information-classification determining section.

Patent Document 1: U.S. Pat. No. 6,266,649 Gregory D. Linden, Jennifer A. Jacobi, Eric A. Benson, Collaborative recommendations using item-to-item similarity mappings Patent Document 2: Patent Publication JP-A-2009-181428

Non-Patent Document 1: Abhinandan S. Das, Mayur Datar, Ashutosh Garg, Shyam Rajaram, "Google news personalization: scalable online collaborative filtering", In WWW '07: Proceedings of the 16th international conference on World Wide Web (2007), pp. 271-280

Non-Patent Document 2: J. Kleinberg, "Authoritative sources in a hyperlinked environment", In Proceedings of the Ninth Annual ACM-SIAM, Symposium on Discrete Algorithms, 1998, pp. 668-677

SUMMARY

In the conventional method, an evaluation of a certain user is determined according to how the other users evaluate the evaluation itself of the user. However, since an evaluation of a user himself/herself is different depending on a user, for example, a user highly evaluated by a certain user i is not always highly evaluated by another user j as well. Therefore, when a user k (an active user) belongs to a minority group compared with an evaluation tendency of a certain user, an evaluation for the user k of a recommended item is likely to be low. That is, when evaluation criteria of the user k are substantially different from evaluation criteria of other majority users, even if a set of users having high similarity to the user k is created and an item is extracted with weight placed on an evaluation of a user highly evaluated by the users in the set, a value of the item is not always high for the user k.

In particular, when there are only a small number of authority users in the similar user set, a probability that a standard of value of the user k and a standard of value of the authority users are different is high. Therefore, recommendation performance is deteriorated. Further, this tends to be conspicuous as viewpoints of contexts are diversified. This is because a user having high similarity in a certain viewpoint does not always have high similarity in another viewpoint.

Therefore, an exemplary object of the present invention is to perform highly accurate recommendation even when there are only a small number of users having similar preference tendencies.

A recommender system according to the present invention is a recommender system that provides a user with an information object, the recommender system including: an input section configured to receive a search request from the user; a user managing section configured to manage context information representing a characteristic of the user; an index-table managing section configured to manage a plurality of information objects and output an information object related to the search request of the user; a user-authority-value managing section configured to calculate, on the basis of similarity between users calculated from comparison of the context information of the user and another user and reliability from a plurality of users for the other user, an authority value representing reliability from the user for the other user; a rating calculating section configured to calculate an evaluation value of the user for the information object using a value obtained by weighting an evaluation value of the other user for the information object according to the authority value of the other user; and a ranked-list creating section configured to output a list of information objects ranked on the basis of the evaluation value of the user.

According to an exemplary aspect of the present invention, it is possible to perform highly accurate recommendation even when there are only a small number of users having similar preference tendencies.

EXEMPLARY EMBODIMENT

A mode for carrying out the present invention is explained in detail with reference to the drawings.

Figure 1:
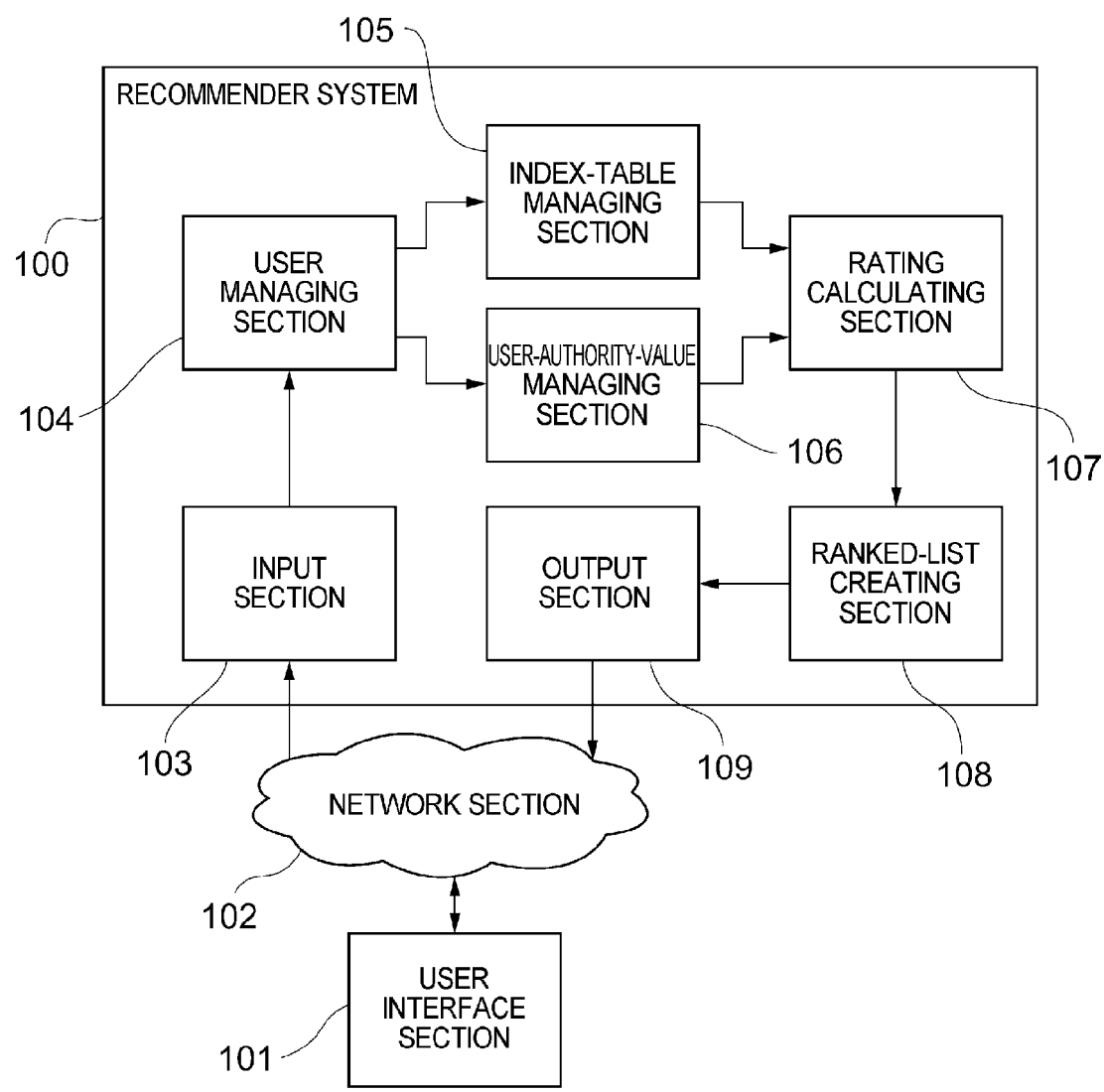
FIG. 1 is a block diagram showing the configuration of a recommender system according to an embodiment of the present invention.

FIG. 1 is a block diagram showing the configuration of a recommender system 100 according to an exemplary embodiment of the present invention. The recommender system 100 is connected to, by a network section 102 represented by the Internet, a user interface section 101 represented by a browser mounted on a computer, which operates according to program control, used by a service receiver (a user k, an active user).

The recommender system 100 includes an input section 103 configured to process input information from the user k, a user managing section 104 configured to manage information concerning the user k, an index-table managing section 105 configured to index and manage objects to be presented to the user k, a user-authority-value managing section 106 configured to manage evaluation information of users, a rating calculating section 107 configured to calculate ratings for the user k of the objects, a ranked-list creating section 108 configured to create a ranked list by sorting a set of the objects on the basis of rating information of the objects, and an output section 109 configured to process a processing result to be capable of being displayed in the user interface section 101 and output the processing result through the network section 102.

As the recommender system 100, a dedicated or general-purpose computer including a CPU, memories such as a ROM and a RAM, an external storage device configured to store various kinds of information, an input interface, an output interface, a communication interface, and a bus for connecting these devices can be applied. The recommender system 100 may be configured by a single computer or may be configured by a plurality of computers connected to one another via a communication line.

The input section 103, the user managing section 104, the index-table managing section 105, the user-authority-value managing section 106, the rating calculating section 107, the ranked-list creating section 108, and the output section 109 are equivalent to modules of functions realized by the CPU executing a predetermined program stored in the ROM or the like.

The user interface section 101 performs exchange of input and output information with the user k. For example, the user interface section 101 transmits a search keyword input of the user k and situations of the users such as and location information to the recommender system 100. The user interface section 101 receives a result obtained by sorting objects related to a search keyword from the recommender system 100 and outputs the result.

The network section 102 is a computer network represented by the Internet for connecting a client system (the user interface section 101) of the user k and the recommender system 100.

The input section 103 has a function of enabling connection to the user interface section 101 via the network section 102 and receives input information to the recommender system 100 from the outside.

The user managing section 104 manages information concerning a user who accesses the recommender system 100. Specifically, the user managing section 104 manages user profile information, a history of objects referred to in the past and preference information, evaluation information of the other users, and the like. The user managing section 104 creates a key represented by a keyword on the basis of information received via the input section 103. When a keyword is directly input from the user, the user managing section 104 associates the user information and the keyword. However, when location information or other indirect information is input, the user managing section 104 automatically generates a key deeply related to the information and generates information in a format compatible with a key managed by the index-table managing section 105.

The index-table managing section 105 manages an index table associated with keywords deeply related to objects handled by the recommender system 100. The index-table managing section 105 outputs, in response to a keyword input, an object set deeply related to the keyword.

The user-authority-value managing section 106 outputs, using behavior histories of the users and mutual evaluation results of the users, authority value information that is an index for determining reliability of evaluations of the other users for the user k.

The rating calculating section 107 calculates, on the basis of object information and authority information, evaluation values of the objects for the user k.

The ranked-list creating section 108 sorts the objects on the basis of a calculation result of the rating calculating section 107 and creates a list of objects ranked in order matching the preference of the user k.

The output section 109 processes the information such that the user k can correctly browse the ranked list of the objects using the user interface section 101 and outputs the information through the network section 102.

Figure 2:
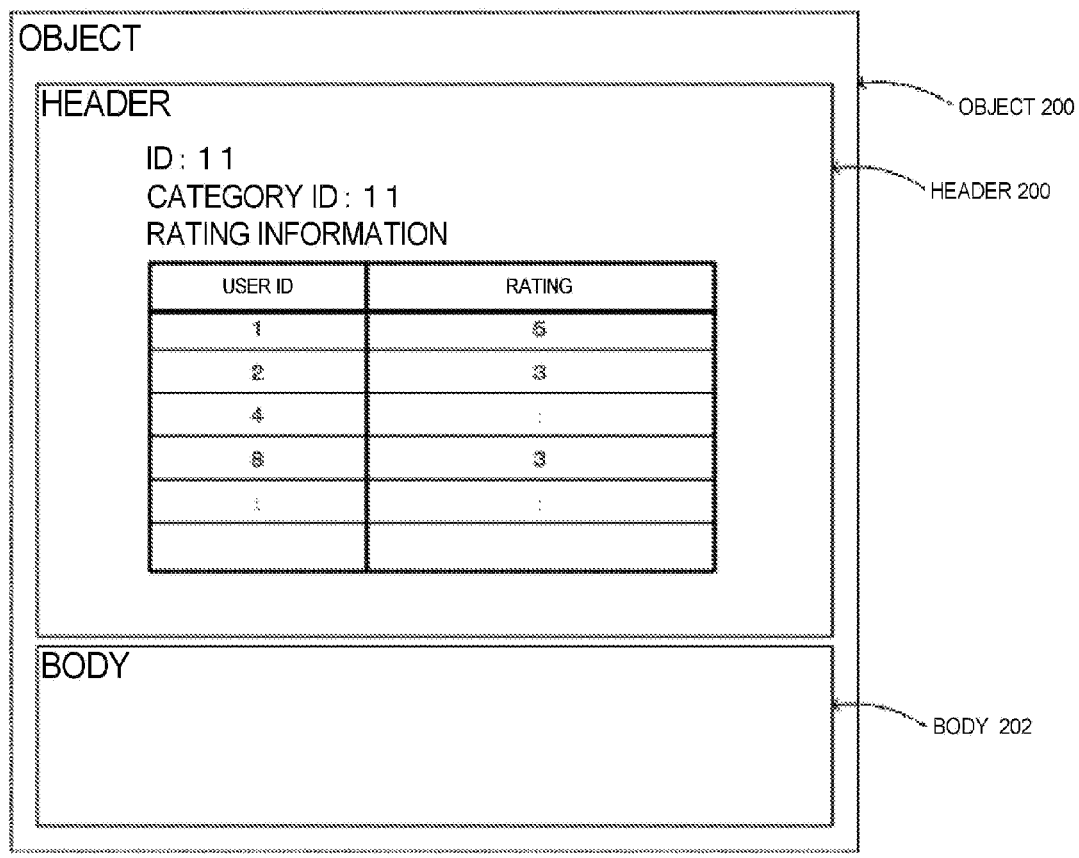
FIG. 2 is a diagram showing an example of the structure of an object handled by the recommender system according to the embodiment of the present invention.

FIG. 2 is a diagram showing an example of the structure of an object 200 handled by the recommender system 100. The object 200 includes a header 201 and a body 202. The header 201 includes meta information concerning the object and the body 202 includes actual content information of the object or reference information for enabling reference to the content information.

If the recommender system 100 is, for example, a word-of-mouth site for movies, the content information is information concerning one movie. If the recommender system 100 is a music information site, the content information is song information or the like. In general, the content information is a unit of information and data to be handled.

The header 201 includes, besides general meta information such as an object ID and a category ID for classifying the object, for example, information concerning evaluation results of users who browsed the object in the past.

Key information automatically generated by the user managing section 104 is information that can be input as key information of the index-table managing section 105 and is information representing contexts of the users. For example, the key information is a characteristic keyword of a file currently being browsed and edited or a keyword representing information deeply associated with present location information and time. Examples of the information deeply associated with the present location information include information concerning facilities such as restaurants and famous places present near a place of the present location information and advertisement information deeply related to the place.

Figure 3:
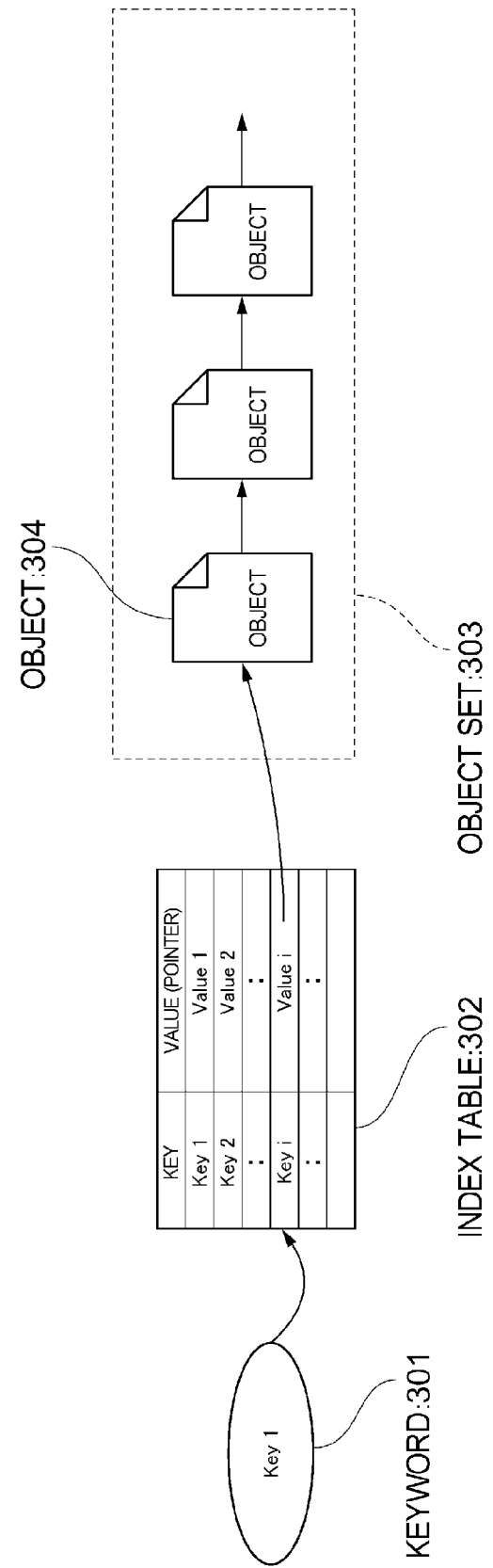
FIG. 3 is a diagram for explaining in detail an index-table managing section according to the embodiment of the present invention.

FIG. 3 is a diagram for explaining the index-table managing section 105 in detail. The index-table managing section 105 is a function of creating an index in advance to enable the users to instantaneously refer to information related to a certain key from a set of objects managed by the recommender system 100. An index table 302 is formed by a pair of a key and a value and stores information deeply related to the key as the value. The key is typically a keyword. The value is information such as a pointer for enabling reference to an object set 303 deeply related to the key.

For example, the index table 302 may store a top object pointer of the object set 303. Objects 304 belonging to the object set 303 may be collected to be capable of being mutually referred to as a linked list. Besides, the index table 302 only has to be an index table in which a set of the objects 304 deeply related to the key can be referred to from the value. The index-table managing section 105 searches, in response to an input of the keyword 301, a corresponding row in the index table 302 and outputs the object set 303 using a value in the row. The index table 302 can be configured by various methods. The index table 302 can be configured by extracting a keyword deeply related to an object through, for example, natural language processing of the object and creating an inverted dictionary of the keyword.

Figure 4:
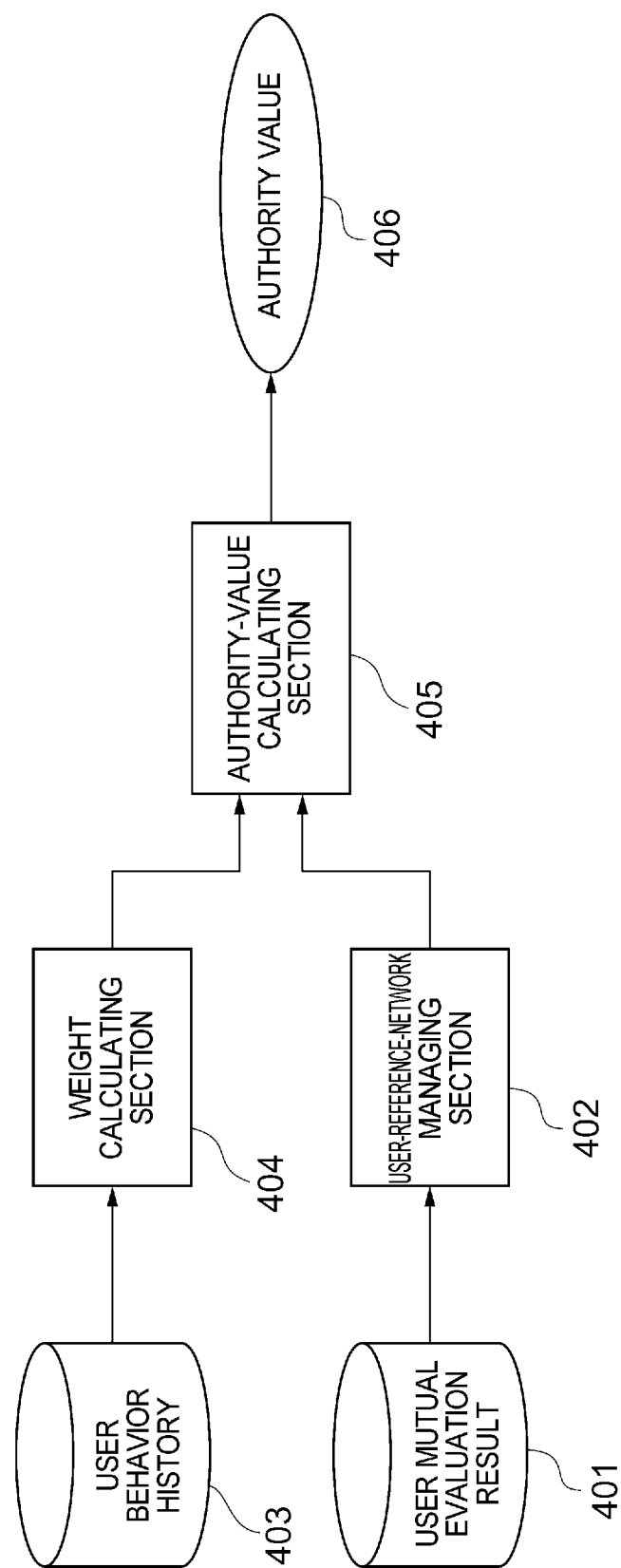
FIG. 4 is a diagram for explaining in detail a user-authority-value managing section according to the embodiment of the present invention.

FIG. 4 is a diagram for explaining the user-authority-value managing section 106 in detail. The user-authority-value managing section 106 includes a user-reference-network managing section 402, a user behavior history 403, a weight calculating section 404, and an authority-value calculating section 405. The user-authority-value managing section 106 outputs an authority value vector 406 calculated on the basis of a user mutual evaluation result 401 and the user behavior history 403.

The user mutual evaluation result 401 is a user evaluation index determined from an evaluation result for the other users of the users and indicating which users are evaluated and how high the users are evaluated. For example, when a user looks at a review content in the past of a certain user and evaluates the certain user high because, for example, the certain user has an opinion same as the opinion of the user, the user gives a high score such as 4 or 5 in a five-grade evaluation. Note that not all of the users need to evaluate one another and only a part of the users may evaluate one another.

The user-reference-network managing section 402 represents an evaluation relation as a graph using the user mutual evaluation result 401. For example, the user-reference-network managing section 402 creates a graph in such a manner as to represent an evaluation as a binary number, create an edge as A->B when a user A evaluates a user B, and create an edge for a user not to be evaluated. The user-reference-network managing section 402 may connect the users in full mesh and allocate a user evaluation value as weight of the connection.

The user behavior history 403 is a behavior history in the past of the respective users used for extracting the similarity of contexts among the users from context information such as characteristics and preference information of the users. The behavior history can be recorded either by a direct method or an indirect method.

Examples of a static context include preference information for objects. Examples of the direct recording method include a method of recording how the users evaluated objects. For example, the preference information is information indicating that a user i gives a score 7 of a ten-grade evaluation to an object x and is information that is a source of an input to rating information of the header 201. Evaluations of all the users are not always necessary for a certain object.

Examples of information recorded by the indirect recording method include information based on the number of times of reference, a reference time, and the like to objects based on a click history. Beside, a profile (age, sex, address, etc.) of a user and a range of interest clearly indicated by the user himself/herself may be included in the information.

Examples of a user behavior history, which is dynamic context information, include locational information such as accumulated data of geodetic coordinate data obtained by a GPS. For example, transitional locational information indicating where a user was present in recent several hours is strong context information. The similarity of the locational information is considered to have a strong correlation with the similarity of necessary information.

Further, in general, information including both of the static information and the dynamic information may be handled. These kinds of information are sets of hetero information but can be represented typically as sets of vectors. The similarity of these kinds of information can be defined by a distance between the sets.

The weight calculating section 404 calculates similarity among the users on the basis of the user behavior history 403 and outputs weight used in the authority-value calculating section 405. The weight is information concerning the importance of the other users from the viewpoints of the users. The weight can be typically represented by a matrix but is not limited to the matrix.

The authority-value calculating section 405 calculates authority values of the users on the basis of user reference network management information and weight information and outputs authority value information, which is evaluation values for the other users from the viewpoints of the users.

Figure 5:
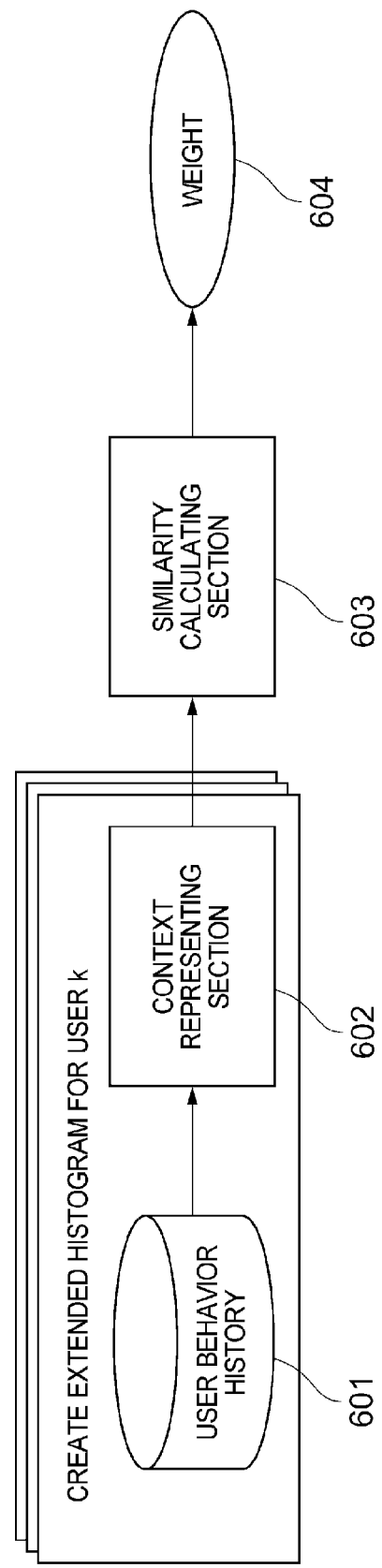
FIG. 5 is a diagram for explaining a method of weight calculation of a weight calculating section according to the embodiment of the present invention.

FIG. 5 is a diagram for explaining a method for weight calculation of the weight calculating section 404. Weight is calculated from the similarity of a user behavior history. However, it is necessary to efficiently calculate the similarity with respect to hetero information rather than using a mere set. Therefore, the user behavior history is not directly handled but is once converted into a context representing section 602, which is a compressed form of information. The context representing section 602 has an information compression effect for representing user behavior histories indicating preference to objects having high similarity as the same user behavior history except small differences.

For example, as an example of static context information, rating information for an object is considered a user behavior history. A characteristic of the object x is represented by a vector $v_x$ of an arbitrary dimension (a D-dimension) and rating information $s_x$ of the object x is represented by a real number. Then, a user behavior history U can be represented by a set of a pair of the D-dimensional vector and the real number such as $U=\{x\}=\{(v_x, s_x) \in R^D \times R\}$. It is assumed that there are objects x and y, the similarity of the objects x and y is defined by a distance $d(x, y)=|v_x-v_y|$, and $d(x, y)$ is small (that is, similar). When the user i evaluates the object x high ($s_x$ is large) and the user j evaluates the object y high ($s_y$ is large), similarity between the user i and the user j is increased. When there are a plurality of evaluated objects, as an evaluation tendency of the objects, similarity between users who evaluates similar objects as high (low) in a similar manner is increased. As an example of a method of realizing the function, there is a method explained below.

The user behavior history 403 (in FIG. 5, 601) retains, for the objects, characteristic information of the objects and preference information of the users acquired by the direct or indirect method. As an example in the following explanation, it is assumed that, for objects x, the characteristic information is represented by a multi-dimensional vector $v_x$, the preference information is represented by an integer $s_x$ of −5 to 5, and $(v_x, s_x)$ is retained. For the objects x, atomic label values for the objects x are calculated using the following hash function f(v).

$$f(v) = \left\lfloor \frac{A \cdot v + R}{W} \right\rfloor \mod C \qquad [\text{Math. 1}]$$

In the expression,
[Math. 2]
$\lfloor z \rfloor$ represents a maximum integer not exceeding z and C and W represent parameters designated in advance by a user and are respectively a natural number and a real number equal to or larger than 2. R represents a uniform random number equal to or greater than 0 and less than W and A represents a vector having the same dimension as v. Elements of the vector A are random numbers conforming to an independent standard normal distribution N(0, 1). B pieces of the hash function are independently created. $L(v_x)=<f_1(v_x), \ldots, f_B(v_x)>$ obtained by multiplexing atomic labels of the respective hash functions is set as a label for the object x. The multiplexed label has a characteristic that objects having close characteristic vectors are highly likely to have the same label.

A method in which the context representing section 602 creates an extended histogram creating method using this label calculation is explained below. The extended histogram is a frequency distribution of objects registered in bins affixed with a plurality of different labels. Unlike the normal histogram, the extended histogram can have a negative value as well. When a set $Ti=\{(v_x, s_x)\}$, which is a user behavior history of a certain user i, is given to the user i, the context representing section 602 calculates an extended histogram $H_i$ for the user i. The context representing section 602 calculates the labels for all the objects x belonging to the set Ti and performs operation for registering the objects x in bins affixed with the labels. When the registration of all the objects is finished, the context representing section 602 calculates the frequencies of the bins. The following expression is used as a calculation formula in calculating the frequency.

$$h_i(L) = \sum_{x \in B_L} s_x \qquad \text{[Math. 3]}$$

In the expression, $B_L$ represents a bin having a label L. A frequency $h_i(L)$ of the bin $B_L$ is a sum of evaluation values of all objects registered in the bin. Since $s_x$ can have a negative value, it should be noted that $h_i(L)$ can be a negative value as well. If $h_i(L)$ is used, the extended histogram $H_i$ can be represented by the following expression.

$$H_i = \sum_L h_i(L) e_L \qquad \text{[Math. 4]}$$

In the expression, the extended histogram $H_i$ can be represented as one point of a $D_L$-dimensional vector obtained when the number of all labels is represented as $D_L$. $\{e_L\}$ represents a normalized orthogonal system and $e_L$ represents a unit vector corresponding to the label L. According to this method, in the extended histogram, the frequency of a label corresponding to a preferred object has a large positive value, the frequency of a label corresponding to a non-preferred object has a large negative value, and the frequency of a label corresponding to an object evaluated neutrally or hardly evaluated has a value close to 0. Users having similar preferences have similar extended histograms. Therefore, it is possible to evaluate similarity using a similarity calculating section 603.

The similarity calculating section 603 evaluates similarity among the users using the extended histograms of the users. For example, an inner product between normalized extended histograms can be used. However, the evaluation is not always limited to the inner product. The similarity calculating section 603 outputs weight 604. A value of the similarity may be directly used as the weight 604 or may be converted into another real number using an appropriate function. The weight 604 only has to be an increasing function for the importance of the other users from the viewpoint of the certain user k. That is, an evaluation value only has to be higher as the importance is higher. Further, it is also possible to compress a dimension by extracting only labels, absolute values of which are large to some extent, and neglecting the other labels. Specifically, for example, higher-order Q labels are extracted according to a rule set in advance. It is also possible to narrow down viewpoints for calculation of similarity by limiting the labels to portions in which the user is currently interested. For example, the labels may be limited to a label range corresponding to objects deeply related to an input keyword.

In the following explanation, scaling is performed such that the weight 604 is a positive real number in a range of 0 to 1 when the weight 604 is added with 1 and then divided by 2. In general, the weight 604 is an N×N matrix when there are N users. A value in ith row and jth column is an importance index of an evaluation of the user j from the viewpoint of the user i. This processing is basically performed offline. However, necessary correction processing may be performed online to perform update of information.

Figure 6:
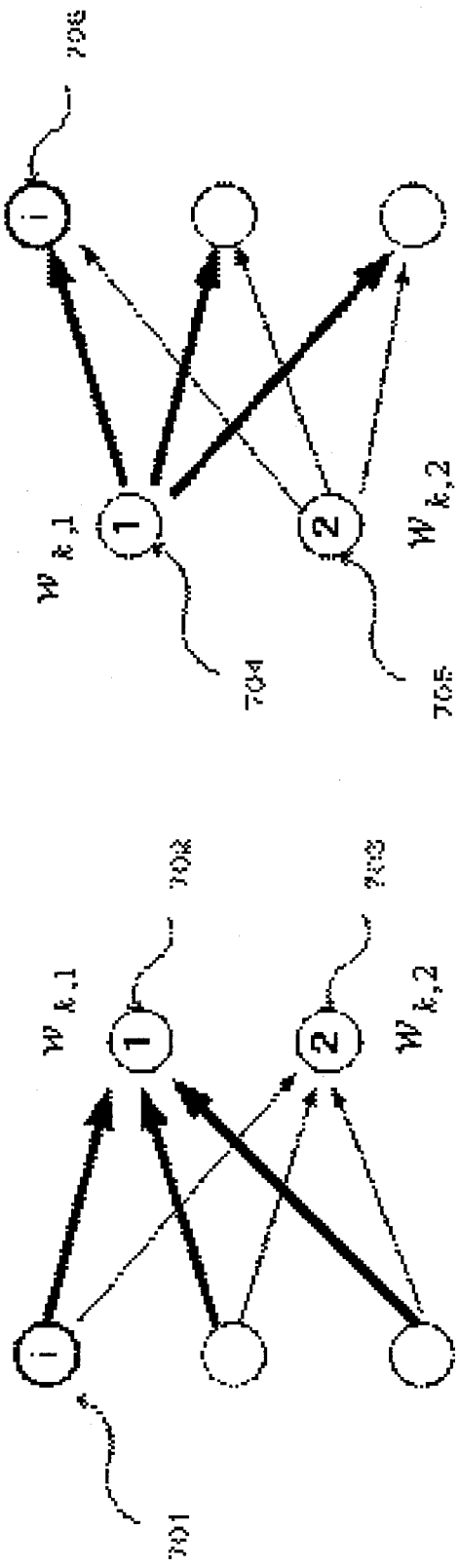
FIG. 6 is a diagram for explaining a method in which an authority-value calculating section calculates authority values of users from the viewpoint of a user k according to the embodiment of the present invention.

FIG. 6 is a diagram for explaining a method in which the authority-value calculating section 405 calculates authority values of the users from the viewpoint of the user k. A basic idea is an algorithm (Weighted HITS) obtained by adding weight to a HITS algorithm developed for Web page search. The weight of context similarity is added as the weight. The HITS is disclosed in Non-Patent Document 2.

The authority-value calculating section 405 calculates authority values of the users represented by nodes of a graph using the weight 604, which is an output of the weight calculating section 404, and an inter-user graph G, which is an output of the user-reference-network managing section 402. In the example explained above, the weight 604 is represented by a matrix. The authority-value calculating section 405 extracts information in a kth row of the matrix and acquires importance $w_{ki}$ of an evaluation of the user i for the user k. Further, the authority-value calculating section 405 creates an importance matrix $W=\{w_{k,1}, \ldots, w_{k,N}\}$ including $w_{ki}$ as a diagonal component. Elements of the inter-user graph G has values of 1 or 0. In the case of a value $g_{ij}=1$ in an ith row and a jth column, it is assumed that there is an edge from the user i to the user j. The authority-value calculating section 405 recursively calculates an authority value of the user i according to the following recurrence formula using W and G.

$$\gamma_i'(t) = G^T W_a a_i(t-1)$$

$$a_i'(t) = G W_\gamma \gamma_i'(t)$$

$$a_i(t) = a_i'(t)/|a_i'(t)|$$

$$\gamma_i(t) = \gamma_i'(t)/|\gamma_i'(t)| \qquad \text{[Math. 5]}$$

In the expression, $G^T$ represents a transposed matrix of the matrix G, t represents an integer equal to or larger than 1, and $a_i(0)=1$ is set concerning all values i. $W_a$ and $W_\gamma$ represent diagonal matrixes, which are matrixes for calculating a weighted sum by importance. Both of $W_a$ and $W_\gamma$ may be equal to W or one of $W_a$ and $W_\gamma$ may be a unit matrix. That is, when I is set as a unit matrix, $W_a=W$ and $W_\gamma=I$ or $W_a=I$ and $W_\gamma=W$.

For a certain node i, $\gamma_i$ indicates a "hub-like" value and $a_i$ indicates an "authority-like" value. $\gamma_i$ represents how high authority-like node the node i points at and $a_i$ represents how many time the node i is refereed to from the hub-like node. In this case, the authority-value calculating section 405 calculates the authority value by multiplying the values with an importance index W of a node actually pointed at. That is, the authority-value calculating section 405 evaluates a hub user, who refers to users having higher importance for the user k, high and evaluates a user referred to by an important hub high. As shown in FIG. 6, a certain node 701 points at nodes 702 and 703 as hubs. It is assumed that the importance and the authority value of the node 702 are respectively $w_{k,1}$ and $a_{k,1}$ and the importance and the authority value of the node 703 are respective $w_{k,2}$ and $a_{k,2}$. The suffix k means that the values are values for the user k. In this case, $\gamma_{k,i}$ of the node 701 is calculated as $\gamma_{k,i} = w_{k,1} \times a_{k,1} + w_{k,2} \times a_{k,2}$.

After calculating $\gamma_{k,i}$ for all the nodes, the authority-value calculating section 405 calculates an authority value $a_{k,i}$. Since nodes 705 and 706 are connected to a node 704 and the importance and a value of $\gamma$ of the node 704 are respectively $(w_{k,1}, \gamma_{k,1})$ and $(w_{k,2}, \gamma_{k,2})$, $a_{k,i}$ of the node 704 is calculated as $a_{k,i} = w_{k,1} \times \gamma_{k,1} + w_{k,2} \times \gamma_{k,2}$ as explained above. As the weighted sum of the recurrence formula, the example of $W_a = W_\gamma = W$ is explained above. However, for example, any one of Ws can be changed to a unit matrix as long as importance based on similarity of determination of the users is reflected on the weighted sum. Since $\gamma_{k,i}$ and $a_{k,i}$ are related to each other, the recursive calculation is performed for a fixed period until $\gamma_{k,i}$ and $a_{k,i}$ converge to obtain the authority value $a_{k,i}$ for the user k of all the users i. The authority value $a_{k,i}$ is output as an authority value of the other users for the user k.

Figure 7:
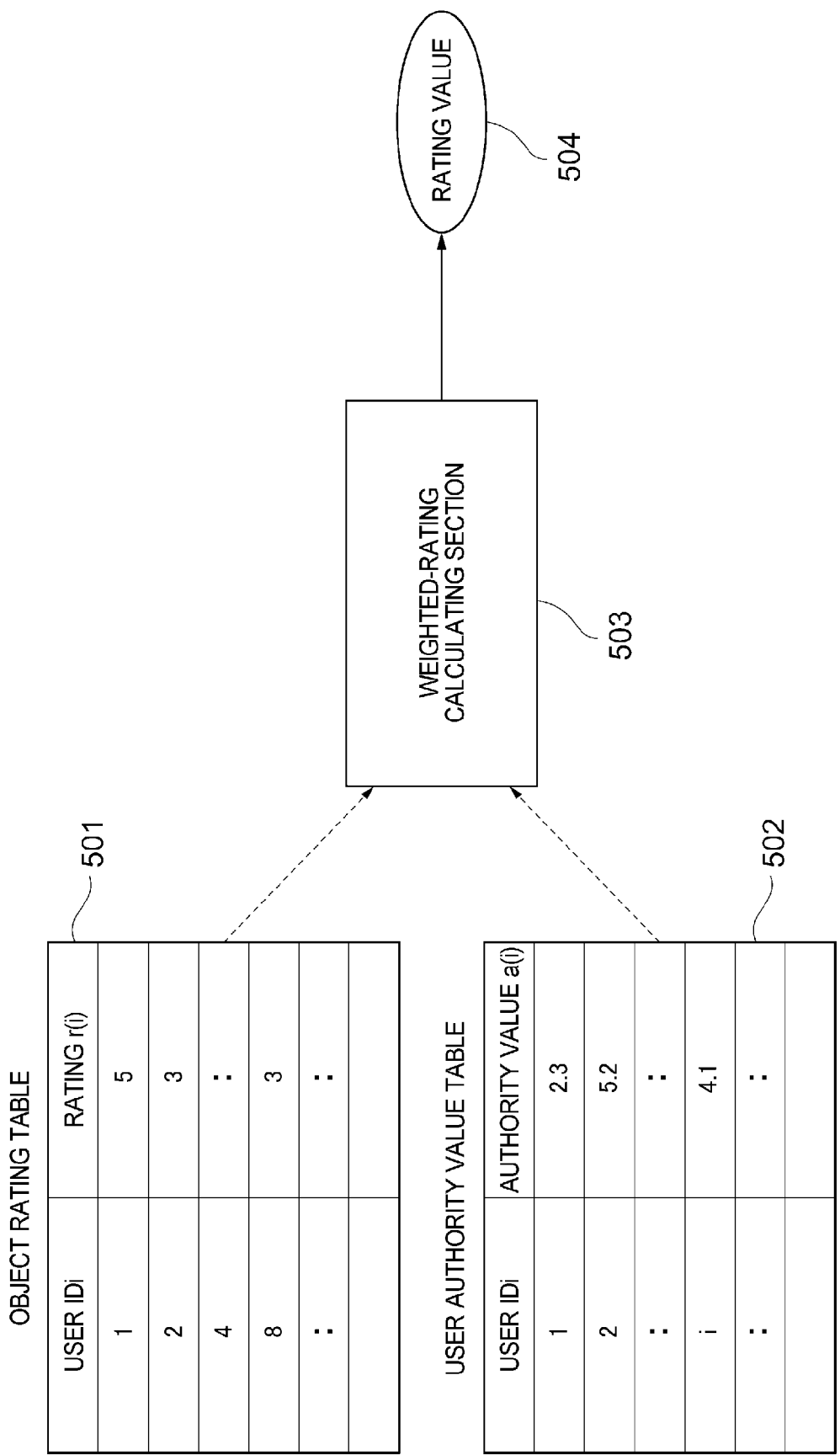
FIG. 7 is a diagram for explaining calculation processing for rating information for the user k of an object x according to the embodiment of the present invention.

FIG. 7 is a diagram for explaining calculation processing for rating information for the user k of the object x. The rating calculating section 107 calculates rating information for the user k of respective objects of an object set on the basis of an object rating table 501 output by the index-table managing section 105 in response to a key input of the user k and a user authority value table 502, which is authority value information of the other users for the user k, output by the user-authority-value managing section 106.

The object rating table 501 includes one table for all the objects belonging to the object set output by the index-table managing section 105. The object rating table 501 is rating information of the other users included in the header 201 as shown in FIG. 2.

In the following explanation, a set of users registered in the object rating table 501 for the object x is represented as $U_x$ and rating for the object x of the user $i \in U_x$ is represented as $r_i$. The user authority value table 502 for the user k includes evaluation value information of the other users defined for the user k. An authority value for the user j is represented as $a_{k,j}$.

The weighted-rating calculating section 503 outputs, for the object x, a rating value 504 for the user k as $\langle r \rangle_k$. A specific form of the rating value 504 is various. However, typically, the rating value 504 can be represented by the following expression. The following expression represents a weighted average of a user rating value using evaluation weight $\omega$ of the users.

$$\langle r \rangle_k = \frac{\sum_{i \in U_x} \omega(a_{k,i}) r_i}{\sum_{i \in U_x} \omega(a_{k,i})} \quad [\text{Math. 6}]$$

In the expression, $\omega(a)$ represents a function uniquely determined for the authority value a and is, in general, a monotone increasing function of a. A specific form of the function $\omega(a)$ is a parameter depending on an administrator. To put it simply, the function $\omega(a)$ is represented by a linear function such as $\omega(a) = pa + q$ (p and q are real numbers).

In general, the calculations themselves in the index-table managing section 105 and the user-authority-value managing section 106 are performed offline in advance. However, it is also possible to perform a correction calculation online according to necessity.

A trigger of the operation of the recommender system 100 may be a direct input of a user or may be a change in dynamic user context information represented by automatically detected location information or the like. Further, the trigger may be periodical update set in advance.

As explained above, according to this embodiment, users having high similarity of preference tendencies and high evaluation abilities with similar evaluation criteria are systematically selected according to a context of a user. Therefore, it is possible to provide information customized for users in response to a change in the context of the user and a search request by a direct keyword input.

EXAMPLE

Figure 8:
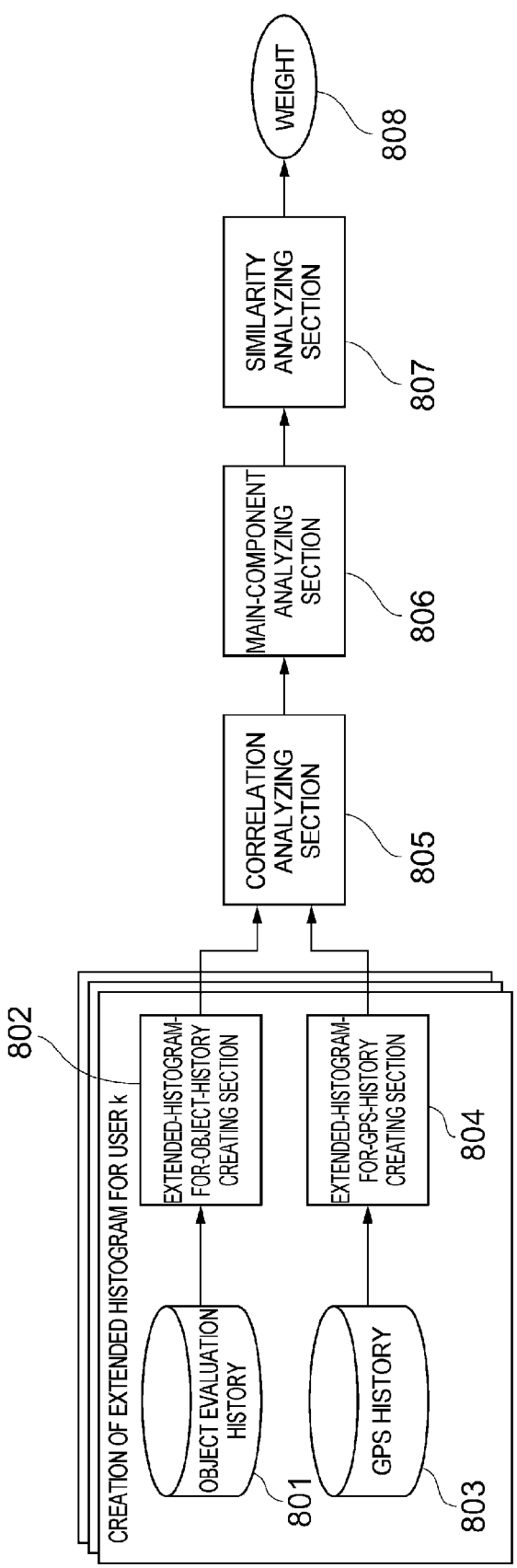
FIG. 8 is a diagram for explaining an example of the present invention.

An example of a weighed calculation for hetero user behavior history information is explained in detail with reference to FIG. 8. As an example of the hetero user behavior history information, both of preference information for objects (an object evaluation history 801) and a present location (a GPS history 803) of a user are handled.

Using the extended-histogram creating section explained above as the context representing section 602, an extended-histogram-for-object-history creating section 802 and an extended-histogram-for-GPS-history 804 respectively output extended histograms as context representation from the object evaluation history 801 and the GPS history 803.

In general, GPS data is a three-dimensional vector. Therefore, the hash function that can be defined concerning an Euclidean distance can be used. However, for example, when the similarity of objects is considered, rather than the Euclidean distance in the example explained above, another distance scale such as cosine similarity (defined by $\cos(u \cdot v / |u||v|)$ with respect to vectors u and v) may be used.

As a distance scale defined in representing the similarity of target history data, various distances such as an Lp distance, a Hamming distance, and a Jacard coefficient are conceivable other than the Euclidean distance and the cosine similarity. However, a corresponding hash function only has to be able to be defined for a considered distance scale.

When a corresponding hash function cannot be defined for some distance defined between elements of user behavior history information, representative information of a user behavior history may be extracted by, for example, simply calculating an average of distances multiplied with weight that reflects evaluation values of the element set without using a hash function. The distances are represented as points in a vector space of appropriate dimensions (D1 and D2 dimensions).

Calculation of similarity of the two users i and j is considered. First, a correlation analyzing section 805 calculates a correlation matrix (a variance-covariance matrix) of context representation between the users. To put it simply, considering that the correlation matrix is a (D1+D2)-dimensional vector formed from a direct sum of the respective vector spaces, the correlation matrix is created. However, the importance of information for each of components may be controlled by multiplying the components with appropriate weight.

A main-component analyzing section 806 performs, using the generated correlation matrix, an eigenvalue calculation for the matrix, extracts components by an appropriate number in order from a component having a largest absolute value of an eigenvalue, and performs dimension reduction by taking into account only a partial space formed by an eigenvector of the components. Consequently, it is possible to represent context information of the users using main components for roughly grasping a characteristic of a user context distribution. A similarity analyzing section 807 calculates the similarity of the users according to a locational relation on the partial space represented by only the main components.

One method of extracting the main components is finding a direction in which variance is large (there is a difference in a characteristic for each of the users). When it is desired to compare the similarity of the users in a specific viewpoint, for example, it is possible to increase the weight of components corresponding to the similarity to increase a difference in the components between the users and select the components as the main components.

This can be represented by converting a vector, which is context representation, using an appropriate linear conversion matrix. For example, in the case of a two-dimensional vector, if a direction desired to be emphasized is a direction at an angle θ from the x axis, when a rotating matrix is represented as R(θ) and a scale conversion matrix for multiplying a scale with u in the x-axis direction is represented as S(u), an arbitrary vector v is represented by R(θ)S(u)R(−θ)v. In general, output weight has a larger value as similarity is higher. Therefore, the similarity in this example can be represented by an inner product between vectors. The similarity is output as weight 808 between the users.

Further, another example in which similarity between users is represented when a plural kinds of user behavior histories are used is explained. In the example explained above, it is assumed that there are the object evaluation history 801 and the GPS history 803 as user behavior histories and context representation of the user behavior histories is obtained. Context representation of the object evaluation history 801 of the user i is represented as $C_{iO}$ and context representation of the GPS history 803 of the user i is represented as $C_{iG}$. It is assumed that similarity of context representations of the object evaluation histories and the GPS histories of the users i and j is defined. For example, in the example in which the hash function is used, the similarity can be defined using an inner product of vectors or the like. When similarity concerning certain context representations C of the users i and j is represented as $S_{i,j}(C)$, similarity of the users i and j can be defined by the following expression.

$$Sim(i, j) = \sqrt[p]{\sum_C [S_{i,j}(C)]^p \alpha_C} \quad \text{[Math. 7]}$$

In the expression, p is an integer equal to or larger than 1. The sum is calculated for all context representations. In this example, the context representations are $C_{iO}$ and $C_{iG}$. In the expression, $\alpha_C$ is weight set in advance for the context representations. The weight $\alpha_C$ is a parameter that satisfies a condition $0 \le \alpha_C \le 1$ and $$\sum_C \alpha_C = 1 \quad \text{[Math. 8]}$$

and represents which contexts are considered important and how important the contexts are considered. When p=1, the sum is a mere weighted sum. When p is extremely large, only contexts having the largest similarity are taken into account.

The present invention can be applied to an application for providing each of users with optimized commodities and information in on-line shopping and an information providing service based on word-of-mouth communication or the like. The present invention can also be applied to a service for detecting a dynamic situation of the present location of a user and providing information such as news, events, and advertisement matching the situation.

This application claims priority based on Japanese Patent Application No. 2011-46855 filed on Mar. 3, 2011, the entire disclosure of which is incorporated herein.

The present invention is explained above with reference to the embodiments. However, the present invention is not limited to the embodiments. Various modifications understandable by those skilled in the art can be made to the configuration and the details of the present invention within the scope of the present invention.

A part or all of the embodiments can be described as indicated by notes below. However, the present invention is not limited to the below description. (Note 1) A recommender system that provides a user with an information object, the system comprising:

an input section configured to receive a search request from the user;

a user managing section configured to manage context information representing a characteristic of the user;

an index-table managing section configured to manage a plurality of information objects and output an information object related to the search request of the user;

a user-authority-value managing section configured to calculate, on the basis of similarity between users calculated from comparison of the context information of the user and another user and reliability from a plurality of users for the other user, an authority value representing reliability from the user for the other user;

a rating calculating section configured to calculate an evaluation value of the user for the information object using a value obtained by weighting an evaluation value of the other user for the information object according to the authority value of the other user; and a ranked-list creating section configured to output a list of information objects ranked on the basis of the evaluation value of the user.

(Note 2) The recommender system according to note 1, wherein the search request is a keyword input by the user or a trigger automatically generated by a software program installed in a terminal of the user.

(Note 3) The recommender system according to note 1, wherein the context information includes preference information for respective information objects and a user behavior history including a present location of the user.

(Note 4) The recommender system according to note 1, wherein the context information includes evaluation information in past by the user for respective information objects.

(Note 5) The recommender system according to note 1, wherein the user managing section creates, on the basis of the context information, key information related to the search request, and the index-table managing section manages respective information objects in association with the key information and outputs an information object corresponding to the key information related to the search request.

(Note 6) The recommender system according to note 1, wherein the user-authority-value managing section includes a context representing section configured to represent, using probabilistic calculating means, a characteristic of a specific portion in the context information and calculates the similarity between the users on the basis of similarity of the specific portion.

(Note 7) The recommender system according to note 1, wherein the user-authority-value managing section calculates the authority value on the basis of reliability from the plurality of users and similarity between the users for evaluation information in past by the other user for an information object.

(Note 8) The recommender system according to note 6, wherein the context representing section represents the characteristic of the specific portion by extracting main components from the context information and subjecting the main components to dimension reduction, and the user-authority-value managing section calculates the similarity between the users on the basis of a locational relation on a partial space represented only by the main components.

(Note 9) A recommendation method for providing a user with an information object, the method comprising the steps of:

receiving a search request from the user;

managing a plurality of information objects and outputting an information object related to the search request of the user;

calculating, on the basis of similarity between users calculated from comparison of the context information of the user and another user and reliability from a plurality of users for the other user, an authority value representing reliability from the user for the other user;

calculating an evaluation value of the user for the information object using a value obtained by weighting an evaluation value of the other user for the information object according to the authority value of the other user; and outputting a list of information objects ranked on the basis of the evaluation value of the user.

(Note 10) A program for causing a computer to function as a recommender system that provides a user with an information object, the program causing the computer to function as:

an input section configured to receive a search request from the user;

a user managing section configured to manage context information representing a characteristic of the user;

an index-table managing section configured to manage a plurality of information objects and output an information object related to the search request of the user;

a user-authority-value managing section configured to calculate, on the basis of similarity between users calculated from comparison of the context information of the user and another user and reliability from a plurality of users for the other user, an authority value representing reliability from the user for the other user;

a rating calculating section configured to calculate an evaluation value of the user for the information object using a value obtained by weighting an evaluation value of the other user for the information object according to the authority value of the other user; and a ranked-list creating section configured to output a list of information objects ranked on the basis of the evaluation value of the user.

The present invention is suitable for performing highly accurate recommendation even when there are only a small number of users having similar preference tendencies.

100: recommender system, 101: user interface section, 102: network section, 103: input section, 104: user managing section, 105: index-table managing section, 106: user-authority-value managing section, 107: rating calculating section, 108: ranked-list creating section, 109: output section, 200: object, 201: header, 202: body, 301: keyword, 302: index table, 303: object set, 304: object, 401: user mutual evaluation result, 402: user-reference-network managing section, 403: user behavior history, 404: weight calculating section, 405: authority-value calculating section, 406: authority value, 501: object rating table, 502: user authority value table, 503: weighted-rating calculating section, 504: rating value, 601: user behavior history, 602: context representing section, 603: similarity calculating section, 604: weight, 701, 702, 703, 704, 705, 706: nodes, 801: object evaluation history, 802: extended-histogram-for-object-history creating section, 803: GPS history, 804: extended-histogram-for-GPS-history creating section, 805: correlation analyzing section, 806: main-component analyzing section, 807: similarity analyzing section, 808: weight

I claim:

1. A recommender system that provides a user with an information object, the system comprising:

a microprocessor;

a memory;

an input section which is implemented as a module of the microprocessor and which is configured to receive a search request from the user;

a user managing section which is implemented as a module of the microprocessor and which is configured to manage context information representing a characteristic of the user;

an index-table managing section which is implemented as a module of the microprocessor and which is configured to manage a plurality of information objects and output an information object related to the search request of the user;

a user-authority-value managing section which is implemented as a module of the microprocessor and which is configured to calculate, on the basis of similarity between users calculated from comparison of the context information of the user and another user and reliability from a plurality of users for the other user, an authority value representing reliability from the user for the other user;

a rating calculating section which is implemented as a module of the microprocessor and which is configured to calculate an evaluation value of the user for the information object using a value obtained by weighting an evaluation value of the other user for the information object according to the authority value of the other user; and a ranked-list creating section which is implemented as a module of the microprocessor and which is configured to output a list of information objects ranked on the basis of the evaluation value of the user, wherein the user-authority-value managing section recursively calculates the authority value on the basis of evaluation results of the plurality of users and similarity between the users for evaluation information in past by the other user for an information object, and by using a relationship between the users that reflects an importance of an evaluation between the users, and wherein, to each of the plurality of users, the authority value determined according to the user who requests a recommendation and the context information of the user who requests the recommendation is assigned.

2. The recommender system according to claim 1, wherein the search request is a keyword input by the user or a trigger automatically generated by a software program installed in a terminal of the user.

3. The recommender system according to claim 1, wherein the context information includes preference information for respective information objects and a user behavior history including a present location of the user.

4. The recommender system according to claim 1, wherein the context information includes evaluation information in past by the user for respective information objects.

5. The recommender system according to claim 1, wherein the user managing section creates, based on the context information, key information related to the search request, and the index-table managing section manages respective information objects in association with the key information and outputs an information object corresponding to the key information related to the search request.

6. The recommender system according to claim 1, wherein the user-authority-value managing section includes a context representing section configured to represent, using probabilistic calculating means, a characteristic of a specific portion in the context information and calculates the similarity between the users on the basis of similarity of the specific portion.

7. The recommender system according to claim 6, wherein the context representing section represents the characteristic of the specific portion by extracting main components from the context information and subjecting the main components to dimension reduction, and the user-authority-value managing section calculates the similarity between the users on the basis of a locational relation on a partial space represented only by the main components.

8. A recommendation method for providing a user with an information object, the method comprising the steps of:
   receiving a search request from the user;
   managing a plurality of information objects and outputting an information object related to the search request of the user;
   calculating, based on similarity between users calculated from comparison of the context information of the user and another user and reliability from a plurality of users for the other user, an authority value representing reliability from the user for the other user;
   calculating an evaluation value of the user for the information object using a value obtained by weighting an evaluation value of the other user for the information object according to the authority value of the other user; and
   outputting a list of information objects ranked based on the evaluation value of the user,
   wherein the calculating the authority value comprises recursively calculating the authority value based on evaluation results of the plurality of users and similarity between the users for evaluation information in past by the other user for an information object and by using a relationship between the users that reflects an importance of an evaluation between the users, and
   wherein, to each of the plurality of users, the authority value determined according to the user who requests a recommendation and the context information of the user who requests the recommendation is assigned.

9. A non-transitory computer readable medium storing a program for causing a computer to function as a recommender system that provides a user with an information object, the program causing the computer to function as:
   an input section configured to receive a search request from the user;
   a user managing section configured to manage context information representing a characteristic of the user;
   an index-table managing section configured to manage a plurality of information objects and output an information object related to the search request of the user;
   a user-authority-value managing section configured to calculate, based on similarity between users calculated from comparison of the context information of the user and another user and reliability from a plurality of users for the other user, an authority value representing reliability from the user for the other user;
   a rating calculating section configured to calculate an evaluation value of the user for the information object using a value obtained by weighting an evaluation value of the other user for the information object according to the authority value of the other user; and
   a ranked-list creating section configured to output a list of information objects ranked based on the evaluation value of the user,
   wherein the user-authority-value managing section recursively calculates the authority value based on evaluation results of the plurality of users and similarity between the users for evaluation information in past by the other user for an information object and by using a relationship between the users that reflects an importance of an evaluation between the users, and
   wherein, to each of the plurality of users, the authority value determined according to the user who requests a recommendation and the context information of the user who requests the recommendation is assigned.

* * * * *